ABSTRACT OF THE DISCLOSURE

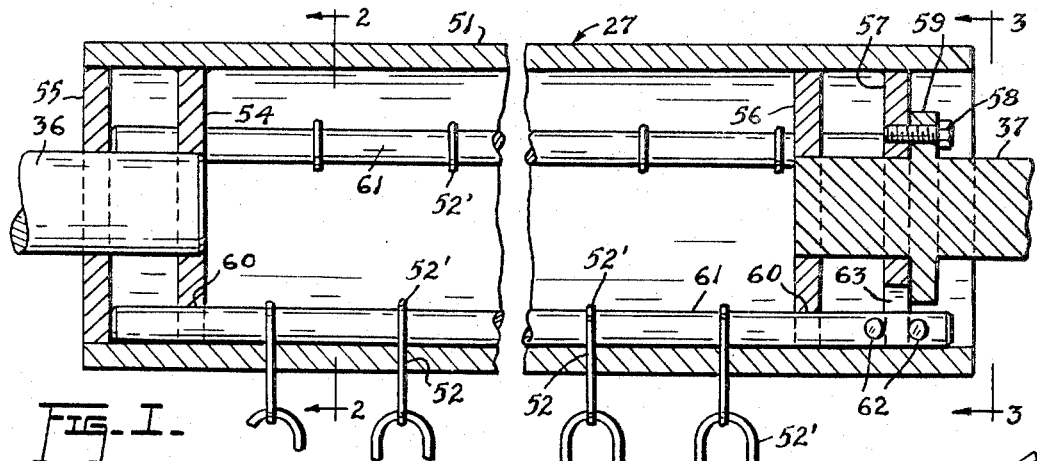
FIG. 1.
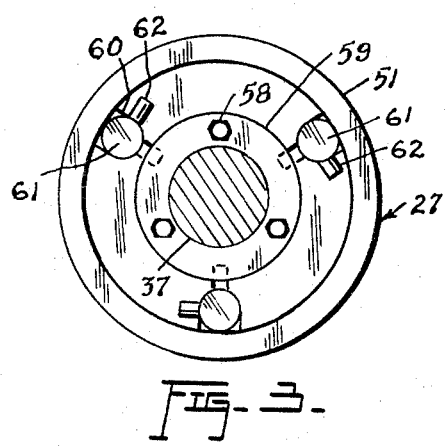
FIG. 3.
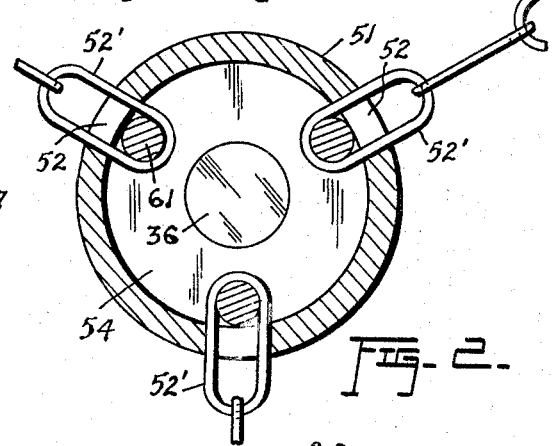
FIG. 2.
FIG. 4.
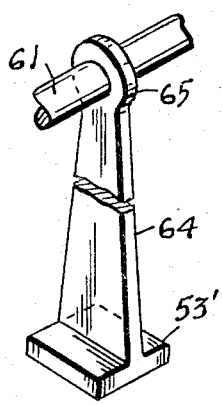
FIG. 5.
INVENTOR
George C. Wood
BY Munson H. Lane
ATTORNEY 3,381,942
BEATER UNIT
George C. Wood, % Darf Corporation,
Edenton, N.C. 27932
Original application Mar. 10, 1964, Ser. No. 350,884,
Divided and this application Jan. 12, 1967, Ser. No. 608,917
7 Claims. (Cl. 259—133)

The present application discloses a beater unit for a material mill, mixer and spreader, said beater unit comprising a tubular shaft provided with circumferentially spaced sets of longitudinally aligned openings, sets of beater members extending radially from said shaft, said beater members having eye-like inner ends projecting into said shaft through said openings, removable keeper rods mounted longitudinally in said shaft and extending through said eye-like inner ends of said beater members whereby to attach the latter to the shaft, and means for removably retaining said keeper rods in said shaft, said means for removably retaining said keeper rods in said shaft comprising at least one disc secured in one end portion of the shaft, said disc being provided in its marginal edge portion with notches slidably and rotatably receiving said keeper rods and also being provided with slots extending radially inwardly from said notches, together with laterally projecting pins provided on end portions of said keeper rods, said pins being adapted to pass through said slots when said rods are slid through said notches into said shaft, but being lockingly engageable with the inner surface of said disc to prevent outward sliding of the rods when the rods are rotated to place said pins out of alignment with the slots.

---

This application is a division of my copending application Ser. No. 350,884, filed Mar. 10, 1964, now Patent No. 3,301,566, dated Jan. 31, 1967.

The aforementioned earlier application discloses a combined mill, mixer and spreader for material such as silage, manure, or the like, such apparatus having a material receiving body with a rotary beater unit therein. The present divisional application concerns itself with construction of the beater unit. The invention will be understood from the following description taken in conjunction with the accompanying drawing, wherein like characters of reference are used to designate like parts, and wherein:

FIGURE 1 is a fragmentary, longitudinal sectional view showing the shaft of the beater unit with flails attached thereto;

FIGURE 2 is a cross-sectional view, taken substantially in the plane of the line 2—2 in FIG. 1;

FIGURE 3 is a cross-sectional view, taken substantially in the plane of the line 3—3 in FIG. 1;

FIGURE 4 is a fragmentary perspective view on a reduced scale of one of the flairs; and FIGURE 5 is a fragmentary perspective view on a reduced scale of a rigid beater member.

Referring now to the accompanying drawings in detail, the beater unit of a combined mill, mixer and spreader comprises a rotary shaft 27 having a plurality of flails or beater members attached thereto as will be hereinafter described. The shaft 27 is provided at the ends thereof with a pair of trunnions 36, 37 in order to facilitate rotatable mounting of the shaft in an operative position in relation to a wagon body or housing containing the material to be processed, substantially as disclosed in my aforementioned Patent No. 3,301,566.

The beater shaft 27 comprises a tubular shaft member 51 which is formed with a plurality of circumferentially spaced sets of longitudinally aligned openings 52 for reception of eye-like inner ends or links at the inner ends of lengths of chain 52' which constitute the beater members or flails and are provided at their outer ends with suitable drags 53.

One end portion of the tubular shaft member 51 has secured therein a pair of spaced discs 54, 55 which are coaxially apertured and have rigidly secured therein, as by welding, the aforementioned trunnion 36. Similarly, the other end portion of the member 51 has secured therein a pair of spaced discs 56, 57 which are apertured to receive the trunnion 37, but the latter is removable from the shaft member 51 and is removably held in position by suitable bolts or screws 58 which extend through a shoulder 59 on the trunnion 37 into the disc 57.

The marginal edge portions of the discs 54, 56 and 57 are provided with notches 60 to slidably receive a set of keeper rods 61. These rods extend longitudinally in the member 51 and pass through the inner end links or eye-like extremities at the inner end of the chains 52', whereby the flails are connected to the shaft member 51 of the beater unit.

At one end the rods 61 abut the disc 55, while the other end portions of the rods are equipped with pairs of spaced pins 62 which project laterally from the rods and may be disposed so that they straddle the disc 57 as shown in FIG. 1, whereby to prevent the rods from being withdrawn from the member 51. For this purpose the notches 60 in the disc 57 are provided with radially inwardly projecting slots 63 through which the inner pin on each rod may pass while the rod is being inserted into the member 51 and is rotated to a position wherein the pin is in alignment with the slot 63. However, when the rods are in place, they are turned so as to place the pins 62 out of alignment with the slots and thereby prevent the rods from being withdrawn.

The rods 61, when installed, are prevented from rotating to a position wherein the pins are aligned with the slots, this being attained by the aforementioned shoulder 59 of the trunnion 37 which shoulder is engageable by the outer of the pins 62 to prevent the rods 61 from turning, unless the trunnion 37 with the shoulder 59 is removed from the assembly.

FIG. 5 illustrates a modified arrangement of the beater members which may be utilized in place of the aforementioned flexible flail means 52', 53. In this modified embodiment the beater members 64 are in the form of rigid straps, provided at their outer ends with the drags or heads 53', while their inner ends are formed with the eyes 65 for anchorage in the shaft member 51 by means of the keeper rods 61, so that a relatively rigid rather than a flexible beater member structure is obtained.

While in the foregoing there have been described and shown the preferred embodiments of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. A beater unit for a material mill, mixer and spreader, said beater unit comprising a tubular shaft provided with circumferentially spaced sets of longitudinally aligned openings, sets of beater members extending radially from said shaft, said beater members having eye-like inner ends projecting into said shaft through said openings, removable keeper rods mounted longitudinally in said shaft and extending through said eye-like inner ends of said beater members whereby to attach the latter to the shaft, and means for removably retaining said keeper rods in said shaft, said means for removably retaining said keeper rods in said shaft, comprising at least one disc secured in one end portion of the shaft, said disc being provided in its marginal edge portion with notches slidably and rotatably receiving said keeper rods and also being provided with slots extending radially inwardly from said notches, together with laterally projecting pins provided on end portions of said keeper rods, said pins being adapted to pass through said slots when said rods are slid through said notches into said shaft, but being lockingly engageable with the inner surface of said disc to prevent outward sliding of the rods when the rods are rotated to place said pins out of alignment with the slots.

2. The device as defined in claim 1 together with means for releasably locking said keeper rods against rotation from the locked position of said pins.

3. The device as defined in claim 2 wherein said last mentioned means comprise a second set of pins provided on said keeper rods and projecting laterally therefrom in a plane outside of said disc, and a shoulder-like abutment member removably attached to the outside of the disc, said second set of pins being engageable by said abutment member and rotation of said keeper rods to the unlocked position of the first mentioned set of pins being possible only upon removal of the abutment member from said disc.

4. The device as defined in claim 1 wherein said beater members are constituted by flails comprising chains and drags connected to the outer ends of said chains.

5. The device as defined in claim 1 wherein said beater members are constituted by flails comprising chains and drags connected to the outer ends of said chains, links at the inner ends of said chains projecting into said shaft through said openings and having said keeper rods extending therethrough.

6. The device as defined in claim 1 wherein said beater members are constituted by rigid straps having eyes provided at the inner ends thereof, said eyes of said straps projecting into said shaft through said openings and having said keeper rods extending therethrough.

7. The device as defined in claim 6 together with rigid drags provided at the outer ends of said straps.

References Cited

UNITED STATES PATENTS

| 52,941 | 2/1866 | Easton | 259—136 |
|---|---|---|---|
| 1,735,393 | 11/1929 | Hiller | 259—9 X |

FOREIGN PATENTS

| 510,492 | 8/1939 | Great Britain. |
|---|---|---|

ROBERT W. JENKINS, *Primary Examiner.*